Dec. 21, 1954  J. F. MOORE  2,697,347
APPARATUS FOR TESTING THE COMPRESSIBILITY
OF RESILIENT MATERIAL

Filed May 24, 1951  3 Sheets-Sheet 1

INVENTOR
JOHN FRANKLIN MOORE

ATTY.

Dec. 21, 1954 J. F. MOORE 2,697,347
APPARATUS FOR TESTING THE COMPRESSIBILITY
OF RESILIENT MATERIAL
Filed May 24, 1951 3 Sheets-Sheet 2

INVENTOR
JOHN FRANKLIN MOORE
ATTY.

Dec. 21, 1954  J. F. MOORE  2,697,347
APPARATUS FOR TESTING THE COMPRESSIBILITY
OF RESILIENT MATERIAL
Filed May 24, 1951  3 Sheets-Sheet 3

INVENTOR
JOHN FRANKLIN MOORE
ATTY.

United States Patent Office 2,697,347
Patented Dec. 21, 1954

2,697,347

APPARATUS FOR TESTING THE COMPRESSIBILITY OF RESILIENT MATERIAL

John Franklin Moore, Toronto, Ontario, Canada, assignor, by mesne assignments, to Dunlop Rubber Company, Limited, London, England Application May 24, 1951, Serial No. 228,023

15 Claims. (Cl. 73—94)

This invention relates to compression testing apparatus especially intended for resilient material such as sponge or foamed latex rubber, and more particularly cushions with respect to which the invention will be described. Apparatus for testing the compression or hardness of resilient material has been devised, but existing apparatus is complicated and in some cases, inaccurate.

It is an object of this invention to devise such apparatus which will be simple and accurate and also self setting.

The hardness of a foamed latex product, according to the Rubber Manufacturers Association specifications is the force required to compress the product ¼ of its initial thickness over a flat circular area of 50 square inches at a rate of 25 inches per minute. The initial thickness is considered to be the thickness of the product when supporting a load of one pound over the above mentioned area of 50 square inches.

The apparatus, according to the present invention, provides for the commencement of the measuring of the force applied to the article after an initial one pound pressure has been applied to the article, and also provides for accurate measurement of the distance of travel of the compressing apparatus relative to the initial thickness of the article. The force of compression is measured while the compressing apparatus is in motion and while the product is being compressed, rather than after the compressing apparatus has come to rest with the product held at a fixed amount of compression.

Figure 1:
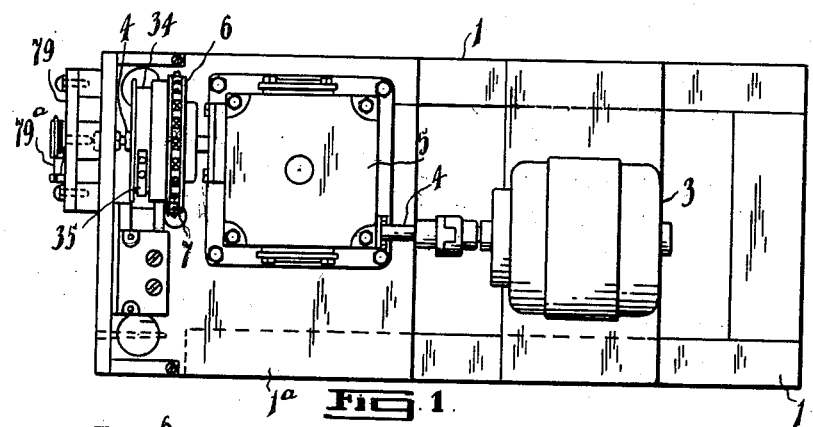
Figure 2:
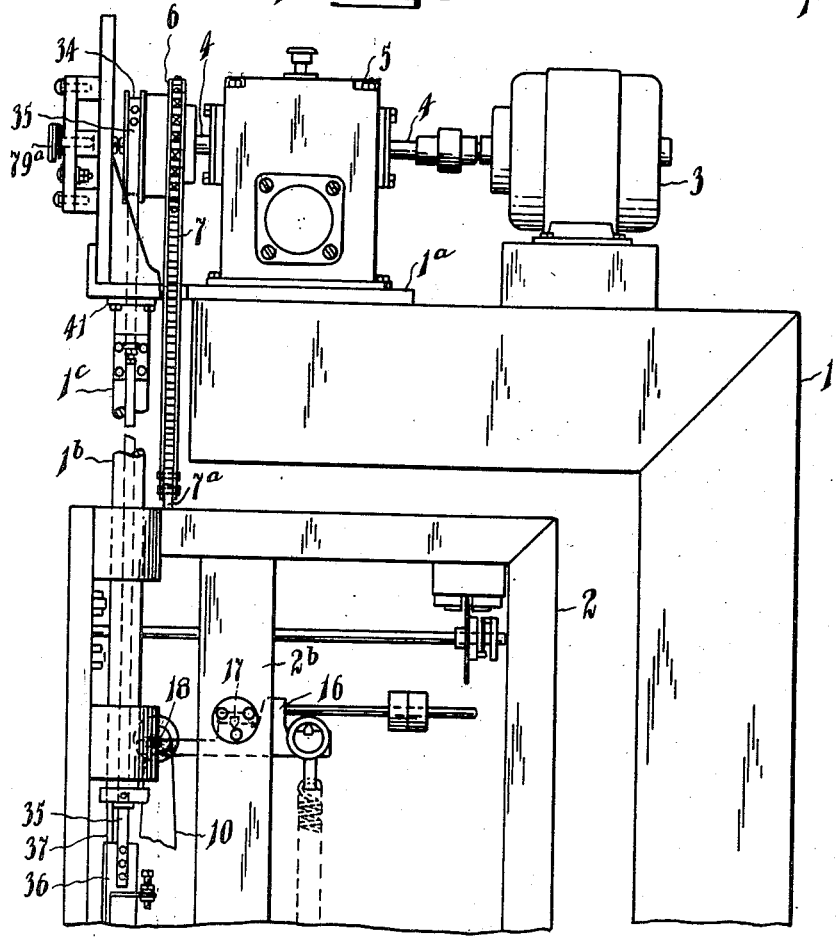
Figures 3, 4:
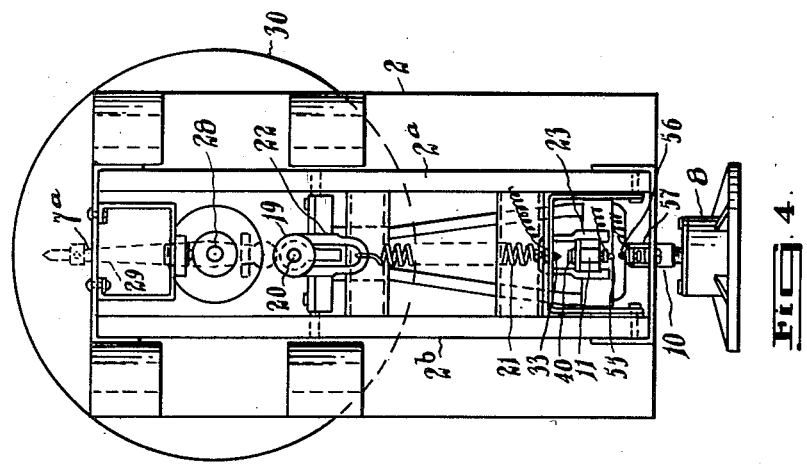
Figure 5:
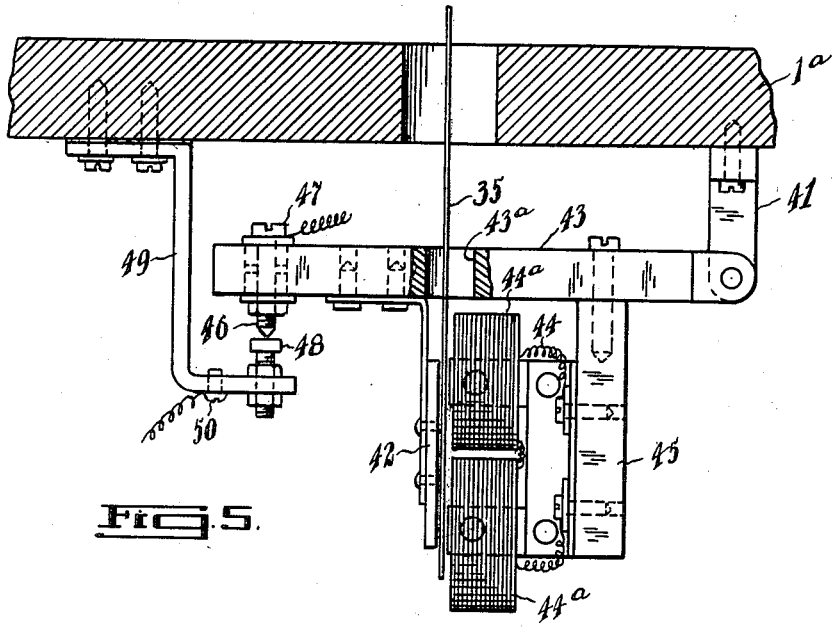
Figure 6:
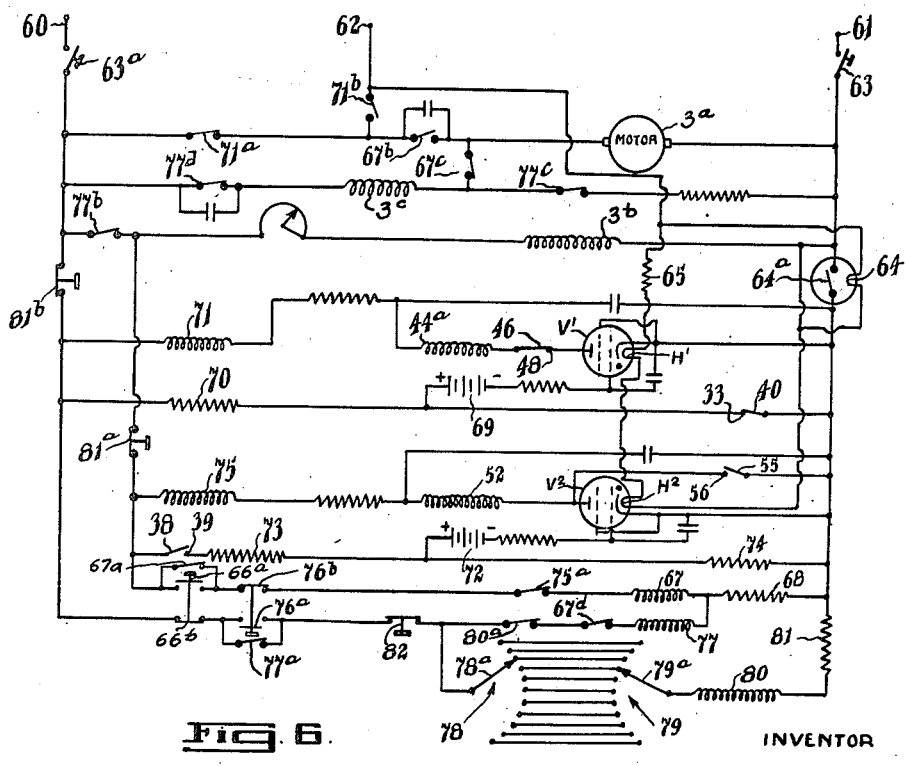

The invention is hereafter described in detail and is illustrated, by way of example, in the accompanying drawings in which:

Figure 1 is a plan view of the apparatus;
Figure 2 is a side elevation of the apparatus with the lower portion thereof broken away;
Figure 3 is a vertical section of the lower or measuring portion of the apparatus showing parts thereof in side elevation;
Figure 4 is a section on the line 4—4 in Figure 3;
Figure 5 is a side elevation of the tape lock; and
Figure 6 is a wiring diagram showing the electrical operating means.

In the drawings corresponding numerals refer to corresponding parts in the different figures.

Broadly speaking the apparatus consists of an indentor plate adapted to engage and compress the article being tested the plate being connected to a scale mechanism adapted to measure the compressive force exerted by the indentor plate, the whole being mounted on a frame which is lowered and raised by means of a motor. Means hereafter described are provided for measuring the ratio of travel of the indentor plate relative to the thickness of the article being tested and to take a reading at the precise moment that the travel of the indentor plate is equal to the required ratio.

Referring particularly to Figs. 1 and 2, the apparatus comprises a fixed frame 1 and a suspended movable frame 2. The fixed frame is substantially inverted L-shaped, the vertical portion being mounted on a fixed body such as a floor in any suitable manner. On the transverse arm of the frame 1 is mounted an electric motor 3 which drives shaft 4 through gear box 5. A sprocket 6 is mounted on shaft 4.

A chain 7 passes over sprocket 6, one end of which may be connected to the sprocket and the other end of which is connected by bracket 7ª to the top of the movable frame 2 which is suspended thereby, and forms a compressing mass for the article to be tested.

Referring now to Figs. 2, 3 and 4, and particularly to Fig. 3, a flat circular indentor plate 8 having a base area of 50 square inches, is mounted by means of ball joint 9 on vertical arm 10 of the scale mechanism. A lower horizontal beam 11 is pivotally supported on knife edge 12 between vertical frame members 2ª and 2ᵇ. One end of beam 11 is pivoted in arm 10 by knife edge 13. The other end is pivoted in ring 14 by knife edge 15.

An upper horizontal beam 16 is pivoted on frame members 2ª and 2ᵇ by knife edge 17 and the upper end of arm 10 is pivotally supported on one end of beam 16 by knife edge 18. Adjustable tare weights 19 are slidably mounted on horizontal tare rod 20 extending from beam 16. Extending between beams 11 and 16 is a coiled tension spring 21 supported between rings 22 and 23 pivotally connected to the beams by knife edges 24 and 25 respectively.

A link 26 is hooked at one end into ring 14 and is secured at its other end to a spring scale assembly 27 which is of a standard construction purchasable on the market and therefore not shown nor described in detail. This assembly includes a shaft 28 on which is mounted a damper disc 28ª which passes between magnets 28ᵇ, 28ᵇ. At the outer end of shaft 28 is an indicating finger 29 provided with a suitably calibrated dial 30.

When motor 3 is operated to turn sprocket 6 in a clockwise direction when viewed from the front of the machine, the chain 7 is unwound to lower the suspended frame 2 which has sufficient weight to provide the force required to compress the article 31 being tested. Secured to and depending from platform 1ª on which gear box 5 is mounted are two rods 1ᵇ and 1ᶜ which slidably extend through lugs on frame 2 to act as guides for said frame. The indentor plate, which is supported by frame 2 as described above moves down and compresses the article 31 placed beneath it for testing on fixed and rigid table 32. The force exerted as measured by the scale assembly 27 is indicated by finger 29 on dial 30.

An upper adjustable limit stop 33 is provided to limit the movement of the beam 11 when the indentor plate 8 is out of engagement with the article to be tested. It is adjusted to hold the dial under one pound pressure, so that the indentor plate 8 must exert a pressure of one pound on the article to be tested before the beam 11 will tilt and actuate the scale assembly 27, as required by the standard set by the Rubber Manufacturers Association.

To determine when the indentor plate has travelled ¼ of the thickness of the article after the initial travel required to engage and apply a force of one pound to the article, and to measure accurately the pressure applied, the mechanism hereafter described is provided.

On the same shaft 4 on which sprocket 6 is mounted, is also mounted a drum 34 to the periphery of which is secured one end of a brass tape 35 having at its other depending end a weight 36 which slides on guide 37. The diameter of the drum 34 is exactly ¾ of the pitch diameter of the sprocket 6. As the sprocket unwinds the chain, the drum unwinds the tape. Due to the relative diameters of the drum and sprocket, the tape travels at exactly ¾ of the speed of the chain and hence the tape moves a distance less by ¼ than the distance the chain moves in the same time.

As shown in Fig. 3 an electrical contact 38 is mounted on and insulated from the weight 36 on the lower end of the tape 35 in vertical alignment with electrical contact 39 mounted on and insulated from scale arm 10. The contacts 38 and 39 are arranged and adjusted to just touch when the indentor plate touches the platform 32 when there is no article on the platform. When the motor 3 is operated to rotate the sprocket and drum to raise or lower the frame 2 and hence the indentor plate 8 the distance apart of the contacts 38 and 39 is always exactly ¼ of the distance between the indentor plate and the platform. Thus if at any time the contact 38 should be held or prevented from moving while the indentor plate was moving toward the platform, the contacts would engage when the compressor plate had moved ¼ of the remaining distance toward the platform.

This is actually accomplished according to the present invention. Stop 33 is also an electrical contact. Another electrical contact 40 is formed on the beam 11 opposite the stop contact 33. As previously explained, when there is no pressure applied to indentor plate 8, contacts 33 and 40 are in engagement. When the indentor plate has applied one pound pressure to the article to be tested, contacts 33 and 40 break. By an electrical system hereafter described, contacts 33 and 40 are connected to a magnetic tape lock shown in Figs. 2 and 5.

The tape lock is supported on a bracket 41 secured to the underside of the platform 1ª. The tape passes between an iron locking strap 42 which is secured to and depends from magnet plate 43 pivoted to bracket 41, and an electro-magnetic core 44 supporting coils 44ª spaced from the locking strap and secured to a magnet plate 45 which is secured to pivot plate 43. Member 1ª is provided with a hole, and the pivot plate is provided with a hole or notch 43ª, for passage of the tape 35 therethrough. At the free end of pivot plate 43 is a contact 46 insulated from said plate and connected to terminal 47. Contact 46 rests on contact 48 secured to contact support 49 which is secured to the underside of member 1ª and insulated therefrom. Terminal 50 is secured to support 49. When the contacts 33 and 40 are separated the circuit is broken and a relay is actuated which energizes the coil 44ª which magnetically attracts the locking strap 42 toward the core 44 clamping and holding the tape therebetween and preventing further movement of the tape. This, of course, holds the contact 38 in the exact position in which it was when contacts 33 and 40 were broken, that is to say at the point where the indentor plate 8 having applied the predetermined pressure of one pound to article 32 moves downward to further compress the article. The apparatus is thus prepared or set for the subsequent operation of measuring the compressibility of the material as hereafter described.

Owing to the relative positions of the contacts as above explained, when the indentor plate has moved ¼ of the distance from the point where one pound pressure was applied to the article, that is when it has compressed the article one quarter of its thickness under one pound pressure, the contacts 38 and 39 will come into engagement.

At the moment when the contacts 38 and 39 engage, a circuit, hereafter described, is energized to stop the motor and apply a magnetic brake to prevent further rotation of the shaft 28 of the scale assembly and retain the indicator 29 at the point relative to dial 30 indicating the actual pressure being applied to the article at the moment the indentor plate has compressed the article ¼ of its thickness after application of the initial one pound pressure.

The means whereby this is accomplished will be hereafter described, but it is desired to point out that by this means the compression is measured while the indentor plate is in motion and while the article is being compressed exactly as specified by the Rubber Manufacturers Association. Other machines measure the force after the indentor plate has come to rest with the article at a fixed amount of compression which is usually inaccurate since the force required to hold the article in compression is slightly less than the force required to compress it. It should also be pointed out that since the contact 39 is mounted on arm 10 which is directly connected to indentor plate 8, and the tape lock is mounted on plate 1ª, which is secured to fixed frame 1, and table 32 is mounted on the same solid base as frame 1, the measurement of the amount of compression takes place directly between the two members between which the material is being compressed. Thus movement of the movable frame 2 or the scale mechanism relatively to the indentor plate does not produce any error in the reading, as would be the case if contact 39 were fixed relatively to the movable frame 2.

As previously pointed out when contacts 38 and 39 touch each other a circuit is closed which actuates a magnetic brake to clamp the shaft 28. The brake consists of a brake disc 51 mounted on shaft 28 and a plurality of electro-magnets 52 mounted on the insert 53 in front cover plate 54 in which shaft 28 is journalled.

When pressure applied to indentor plate 8 exceeds a predetermined amount, say 100 pounds, contact 55 on beam 11 engages contact 56 on insulated bracket 57 on frame 2. This actuates a circuit hereafter described to stop the motor 3.

Referring generally to the schematic diagram shown in Fig. 6, the electric motor 3, the mechanical operation of which is described above, is designed to operate from a source of direct current having a potential of approximately 220 volts, the potential being applied between terminals 60 and 61, terminal 60 being positive with respect to terminal 61. Also, a potential of 110 volts is applied between terminals 62 and 61, terminal 62 being positive with respect to terminal 61. It will be seen that as soon as switch 63 is closed, the heater element 64 of a thermal delay tube is energized so that after a delay of, say, 30 seconds, switch 64ª closes. Simultaneously with the application of voltage to the heater of the thermal delay tube, voltage is also applied to the heaters of Thyratron tubes $V^1$ and $V^2$ through a voltage dropping resistor 65, the heaters being designated as $H^1$ and $H^2$ respectively. Closing of switch 63ª applies the 220 volt potential to the rest of the circuit.

The remainder of the circuit can best be described by outlining its function when a typical test operation is conducted. Assuming that the movable frame 2 is positioned so that the indentor plate is well above the sponge rubber article to be tested, the machine is started in its downward motion by depressing "down" button 66ª thereby energizing relay 67 through dropping resistor 68. Switch 67ª thereupon closes and maintains the voltage on the relay 67 after button 66ª is released. Relay 67 simultaneously closes switch 67ᵇ and opens switch 67ᶜ, with the result that the potential of 220 volts D. C. is applied to the armature 3ª, the shunt field winding 3ᵇ being already energized. Under these conditions of operation, armature 3ª rotates at such a speed that due to gear reducing box 5 and the dimensions of sprocket 6, the indentor plate is lowered toward the article to be tested at a rate of approximately 50 inches a minute. As the article begins to be compressed, the indentor plate is deflected upwardly with respect to member 2 and at the instant when the pressure upon the article is 1 pound, the circuit through contacts 33 and 40 is broken. It will be seen from Fig. 6, that prior to the opening of this circuit Thyratron control tube $V^1$ was not conducting since its control grid was negatively biased by bias battery 69. However, it will be seen that when contacts 33 and 40 are opened, a positive potential is applied through resistor 70, this voltage overcoming the bias voltage produced by battery 69, and the control grid of tube $V^1$ being thereupon made positive, the gas in the tube ionizes and conduction through the circuit thereupon occurs. Current flow through tube $V^1$ immediately energizes relay 71 and magnet coil 44ª. Energizing of coil 44ª clamps tape 35, as described above, and prevents further downward movement of weight 36 and contact 38. Energizing of relay 71 opens switch 71ª and closes switch 71ᵇ so as to remove the 220 volt potential from the armature 3ª and apply thereto the potential of 110 volts from terminal 62. Since the potential across the shunt field 3ᵇ is substantially the same as previously, the speed of rotation of the motor is reduced to one-half and the indentor plate 8 therefore continues to depress the article under test at the reduced rate of 25 inches per minute in accordance with the previously described R. M. A. standard.

Following the locking of tape 35, contact 38 no longer moves downwardly with the remainder of the unit, and therefore contact 39 eventually comes in contact with contact 38 at the moment when the article under test has been compressed to three-quarters of its initial thickness. Prior to the closing of the circuit through contacts 38 and 39, Thyratron tube $V^2$ has remained un-ionized due to the biasing effect of bias battery 72 upon its control grid, even though a positive potential has existed upon its anode. However, on the closing of the circuit through contacts 38 and 39, a positive potential is applied to the positive terminal of battery 72 through resistors 73 and 74. This potential overcomes the biasing potential of battery 72 and permits tube $V^2$ to ionize and become conducting. It will be seen that current conduction through tube $V^2$ then energizes relay coil 75 and "dial locking" coil 52. The indicator 29 is therefore locked in place and the operator can, at his leisure, take the reading since it does not vary in any manner. When relay coil 75 is energized, switch 75ª is opened, thereby de-energizing relay 67. Thereupon switches 67ª and 67ᵇ open and switch 67ᶜ closes. Voltage is thereby removed from the armature 3ª of motor 3 so as to stop the motor and hence arrest the downward motion of the indentor plate.

Before proceeding with a description of the operation of the machine when the indentor plate is to be raised, it should be noted that the contacts 55 and 56 will close in the event that the deflection of the indentor plate rises to an abnormally high value as for example, in the preferred construction, above a value of 100 pounds. On the closing of contacts 55 and 56, the same circuit through relay coil 75 and "dial locking" coil 52 is closed just as if tube V² had been ionized in the above described manner. Hence, if an obstacle is met in the downward travel of the indentor plate, which obstacle prevents the further downward motion thereof, contacts 55 and 56 close, stopping the machine before any damage occurs.

In order to return the indentor plate and its associated measuring assembly to the raised position, the operator presses the "up" button 76ª thereby energizing relay 77 which closes switch 77ª bridging the terminals of button 76ª. Relay 77 therefore remains energized and switches 77ᵇ and 77ᶜ are opened and 77ᵈ is closed. The opening of switch 77ᵇ removes voltage from tube V² and its associated circuits, and also removes voltage from shunt field 3ᵇ of motor 3. Simultaneously, the opening of switch 77ᶜ and the closing of switch 77ᵈ energizes the series-connected motor armature 3ª and the series field 3ᶜ. The magnetic polarity of the series field is arranged to be the reverse of that produced by the shunt field with the result that the armature rotates in the opposite direction so as to raise the movable frame 2 and the indentor plate. As frame 2 rises, contact 39 moves away from contact 38 and eventually a position is reached where the slack in tape 35 has been removed, the tape once again becoming taut. At this point, it will be seen that contacts 33 and 40 have again closed, thereby connecting the positive terminal of bias battery 69 to the cathode of the tube V¹. However, tube V¹ continues to conduct since, unlike a "hard" vacuum tube, once the gas is ionized no variation of the control grid potential will stop anode conduction therethrough. Referring to Fig. 5 it will be seen that as the tape becomes taut, any attempt to further raise the movable frame 2 will lift the tape locking assembly which is pivoted to bracket 41. Lifting of this assembly opens contacts 46 and 48 which are arranged in series with the anode circuit of tube V¹. Thus, momentarily, voltage is removed from the anode of tube V¹ and ionization therein ceases. Consequently, the coil 44ª and hence the core 44 of the electromagnetic tape lock is de-energized and the tape is released. Contacts 46 and 48 thereupon close again and voltage is applied once again to tube V¹. However, no conduction therethrough takes place since the control grid is biased negatively due to the closing of contacts 33 and 40. Therefore the tape continues to move up unimpeded by any magnetization of magnet core 44.

It will be seen that simultaneously with the deenergizing of core 44, relay coil 71 becomes de-energized and switch 71ª closes and switch 71ᵇ opens, thereby preparing the circuit for an application of 220 volts to the armature 3ª of motor 3 when the indentor plate is once again lowered.

In order to automatically stop the machine in its upward travel at any of a plurality of predetermined heights, a manually operable rotary switch 78 is wired in conjunction with a corresponding rotary switch 79 the rotor of the latter being disposed upon the end of shaft 4. The series circuit comprising switches 78, 79, relay coil 80 and dropping resistor 81 is bridged across a portion of the "up" circuit as shown in Fig. 6. As the movable frame 2 moves up and down, rotor arm 79ª rotates. When arm 79ª falls upon a contact corresponding to the predetermined setting of rotor arm 78ª on switch 78, relay coil 80 is energized and switch 80ª is opened. Opening of switch 80ª de-energizes relay 77. Switches 77ª and 77ᵈ open, and switches 77ᵇ and 77ᶜ close. Motor 3 thereupon stops since voltage has been removed from its armature. At this stage all electrical contacts are once again in the same positions as when downward travel was begun at the initiation of the test.

A further refinement in the arrangement of the electrical control system is the provision of mechanically connected "stop" switches 81ª and 81ᵇ. When the operator depresses and therefore opens these switches, relays 67 and 77 are de-energized and the machine immediately stops. It may be started again by merely depressing the appropriate "up" or "down" start button.

The operator may reverse the direction of travel of the indentor plate without having to stop the machine. For example: If the indentor plate is descending, the "down" relay 67 is energized. By pressing "up" button 76ª, a switch 76ᵇ mechanically connected with button 76ª and arranged in series with relay 67, opens, and relay 67 is thereupon de-energized contemporaneously with the energizing of "up" relay 77. Consequently the motor 3 immediately reverses, and the indentor plate rises.

Similarly, the converse may be achieved by depressing "down" button 66ª to which switch 66ᵇ is coupled.

Switch 67ᵈ is opened whenever coil 67 is energized in order to prevent accidental operation of relay 77 in the event that rotor arms 78ª and 79ª of switches 78 and 79 respectively are resting on corresponding contacts.

An "up" limit switch 82 is provided whereby the upward movement of member 2 is automatically stopped in the event that the "stop" circuit through switches 78 and 79 did not function. This could occur if arm 79ª had already passed the contact on which rotor arm 78ª was set.

Throughout the electrical diagram shown in Fig. 6, a number of condensers and resistors are shown, the functions of which are not described. For the most part the condensers are inserted to prevent arcing and burning of switch contacts produced by the inductive reactances in the various coils. Similarly, for the most part, the resistors not described in detail are inserted for the purpose of current limiting. A detailed description of these components is not considered necessary since their functions will be clear to anyone skilled in the art.

It is thought that the construction and use of the invention will be apparent from the above description of the various parts and their purpose. It is to be understood that the form of the invention herewith shown and described is to be taken as a preferred example of the same and that various changes in the shape, size and arrangement of parts may be resorted to, without departing from the spirit of the invention or the scope of the subjoined claims.

What I claim as my invention is:

1. Means for testing the compressibility of articles which comprises a table and a plate having opposed surfaces between which the article to be tested is compressed, means connected to the plate for moving said plate relatively to the table to compress said article between the opposed surfaces, means for indicating the compressive force exerted on the article, means connected to the plate moving means and mounted for movement substantially parallel to the direction of movement of the plate at a predetermined speed differential less than the speed of movement of the article compressing surface of the plate, a member fixed relative to and movable with the plate at the same speed as the article compressing surface of the plate, a member fixed to and movable with the speed differential means, said members being adapted to engage and disengage, means actuated by the compression indicating means for stopping the movement of the last mentioned member when the article exerts a predetermined force on the compressing surfaces, and means actuated by the subsequent engagement of said members to lock the compression indicating means.

2. Means for testing the compressibility of articles as claimed in claim 1, including an electrical circuit and contacts in which the engageable members close the electrical contacts in said circuit and the means for locking the compression indicating means is actuated through the medium of the electrical circuit which is closed when the contacts are in engagement.

3. Means for testing the compressibility of articles, which comprises fixed means for supporting the article to be tested, a plate having an article engaging surface, means connected to the plate for moving said article engaging surface relatively to the fixed supporting means to compress the article against the article supporting means, means connected to the plate moving means and movable substantially parallel to the article engaging surface of the plate of a predetermined speed differential thereto, means for measuring the compressive force exerted by the article on the article engaging surface as the article engaging surface compresses the article, said measuring means including an indicator, an electrical contact on the differential speed means, an electrical contact fixed relative to and movable with the moving article engaging surface at the same speed as said moving surface and adapted to engage and disengage the first mentioned contact, an electrical actuating circuit adapted to be energized when said contacts engage, means actuated by the said circuit for locking said indicator, and means for locking the contact on the speed differential means when a predetermined pressure has been applied to the article, whereby further compressive movements of the article engaging surface will cause the contacts to engage each other to condition the actuating circuit and lock the indicator.

4. Means for testing the compressibility of articles, which comprises means for supporting the article to be tested, a compressing mass, means for suspending said mass above said article and for progressively lowering it thereon, means for measuring the resistance of the article to the mass including indicating means, means for locking the indicating means when the mass has moved a predetermined distance, said locking means comprising a brake electrically operated by a circuit having two operating contacts, one of said contacts being fixed relative to and movable with the mass at the same speed and the other being movable at a predetermined differential speed, and means actuated when the compressive force on the mass reaches a predetermined value to stop one of the contacts, whereby compressive movement of the mass will cause the contacts to engage to condition the circuit to actuate the locking means.

5. Apparatus as claimed in claim 1, wherein electrical limiting means is provided for stopping the approach of the two compression surfaces when a predetermined maximum compressive force is attained, said means comprising a circuit, and a pair of contacts in the circuit arranged to condition the circuit to thereby stop the means for moving the plate relatively to the table.

6. Apparatus as claimed in claim 1, having a pair of normally open direction switches, each being provided with a normally closed second switch mechanically connected thereto, the contacts of each second switch being arranged in series with the contacts of the direction switch to which it is not mechanically connected, whereby direction of travel of the compression surfaces relatively to each other may be reversed, without any intermediate manual operation for stopping the apparatus, by closing the appropriate direction switch.

7. Apparatus as claimed in claim 1, wherein means is provided for automatically stopping the retreat of one surface from the other at a predetermined distance, comprising a pair of rotary switches, one having a manually adjustable rotary contact, the other having its rotary contact rotatable in conformity with the lineal relative motion of the aforesaid surfaces, the stator contacts of the switches being arranged in parallel and the rotors thereof being connected so as to close a circuit to stop the machine when the rotors rest upon electrically connected stator contacts.

8. Apparatus as claimed in claim 1, wherein protective means is provided for stopping the retreat of one surface from the other at a predetermined maximum distance comprising a normally open mechanically operable switch adapted to close when said maximum distance is attained.

9. Apparatus for testing the compressibility of articles which comprises fixed means for supporting the article to be tested, a frame mounted for reciprocatory movement toward and away from the said supporting means, a scale mechanism mounted on the frame for indicating the compression, a beam attached at one extremity to the scale mechanism, a column pivotally connected to the other end of the beam and moveable with the said end of the beam relatively to the frame, said beam having a fulcrum in the frame at a point intermediate its ends so that movement of the column relative to the frame correspondingly deflects the scale mechanism, and an indentor plate for engaging the article to be tested, said plate being secured to the column so that pressure upon the plate registers on the aforesaid scale.

10. Apparatus for testing the compressibility of articles as claimed in claim 9, wherein means is provided for stopping the compression comprising a fixed contact, and a second contact secured to the column and adapted to coact with the first mentioned contact.

11. Apparatus for testing the compressibility of articles as claimed in claim 9, wherein means is provided for locking the scale mechanism against further movement when a predetermined compression is attained, comprising a fixed contact, and a second contact secured to the column and adapted to coact with the first mentioned contact.

12. Apparatus for testing the compressibility of articles as claimed in claim 9 wherein electrical means is provided on the beam for automatically setting the apparatus when a predetermined pressure is applied to the article, said means comprising a circuit, a pair of coacting contacts, one of said contacts being disposed on the moving frame, the other being mounted on the beam opposite said first named contact and being movable by the indentor plate, the said contacts engaging to condition the circuit therethrough when the indentor plate exerts a predetermined force upon the article.

13. Apparatus for testing the compressibility of articles as claimed in claim 9 wherein locking means is provided for locking the scale mechanism against further movement when a predetermined compression is attained comprising an electro-magnet adapted to be energized when the said compression is attained, the scale mechanism including an indicator, a spindle on which the indicator is mounted and a disc on said spindle adjacent said magnet, the said disc being clamped when the magnet is energized in order to lock the indicator.

14. Apparatus as claimed in claim 1, wherein the means for stopping the movement of the member movable with the speed differential means comprises an electromagnetic lock adapted to be energized when the said predetermined force on the compressing surfaces is attained.

15. Apparatus as claimed in claim 1, wherein the means for stopping the movement of the member movable with the speed differential means comprises an electro-magnetic lock adapted to be energized when the said predetermined force on the compressing surface is attained, the said lock including a pair of electrical contacts arranged in series wtih the energizing coils on the lock, and the lock being pivoted so that the contacts open and de-energize the lock when the aforesaid contact, which is adapted to move with the speed differential means, is retracted from its locked position.

References Cited in the file of this patent

UNITED STATES PATENTS

| Number | Name | Date |
|---|---|---|
| 1,931,925 | Hopkins | Oct. 24, 1933 |
| 1,978,302 | Gogan | Oct. 23, 1934 |
| 2,156,877 | Simpson et al. | May 2, 1939 |
| 2,245,080 | Pendleton | June 10, 1941 |